Sept. 26, 1967                    J. A. FORD                    3,343,204
                              MODULAR CONVEYOR
Filed Nov. 1, 1965                                           3 Sheets-Sheet 2
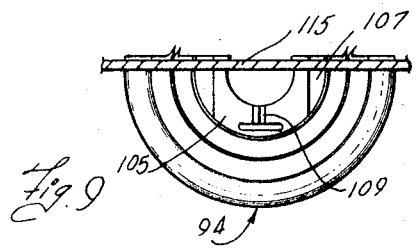
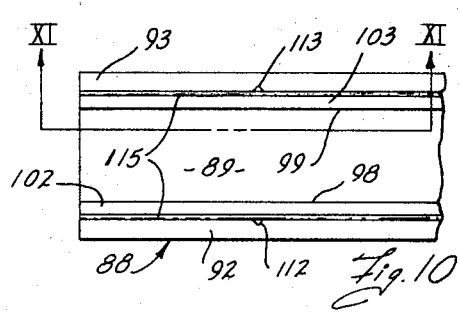
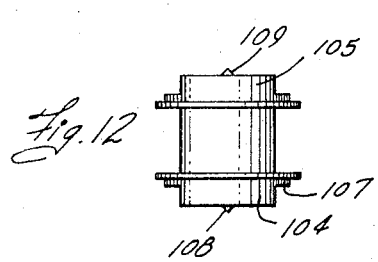
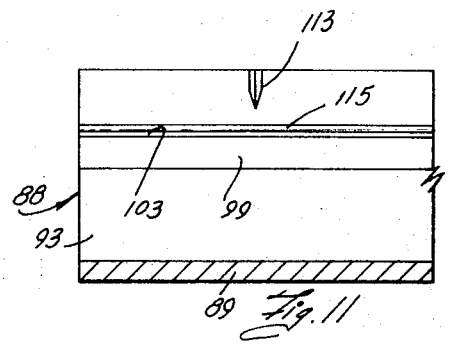
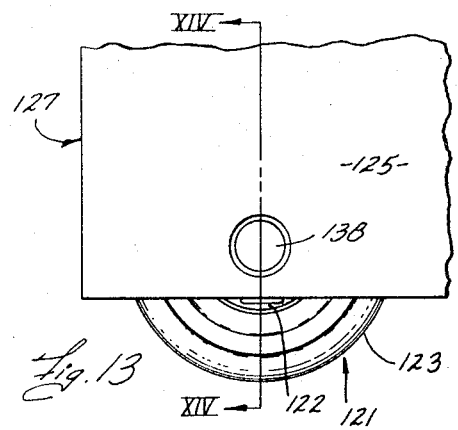
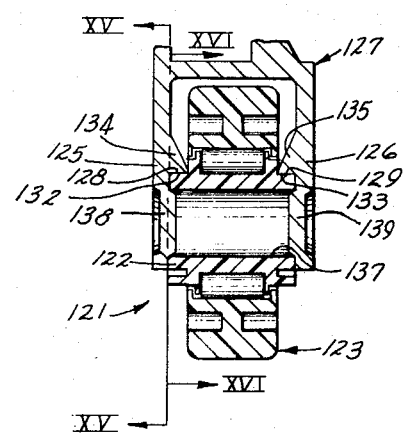
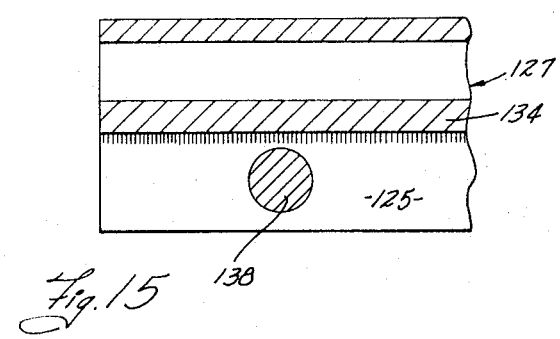
INVENTOR.
JAMES A. FORD
BY
Woodhams, Blanchard and Flynn
ATTORNEYS Sept. 26, 1967     J. A. FORD     3,343,204
MODULAR CONVEYOR
Filed Nov. 1, 1965     3 Sheets-Sheet 3
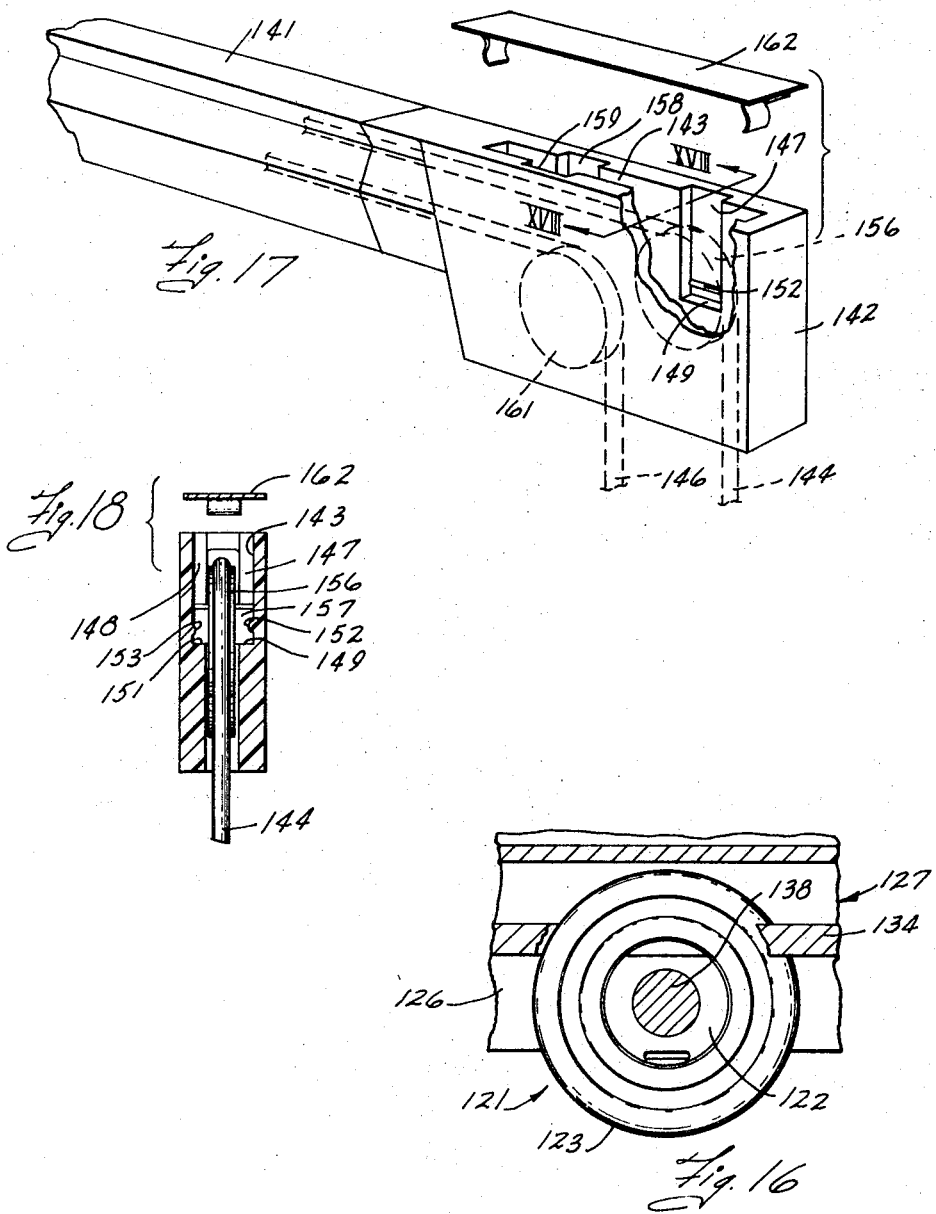
INVENTOR.
JAMES A. FORD
BY
Windham, Blanchard & Flynn
ATTORNEYS

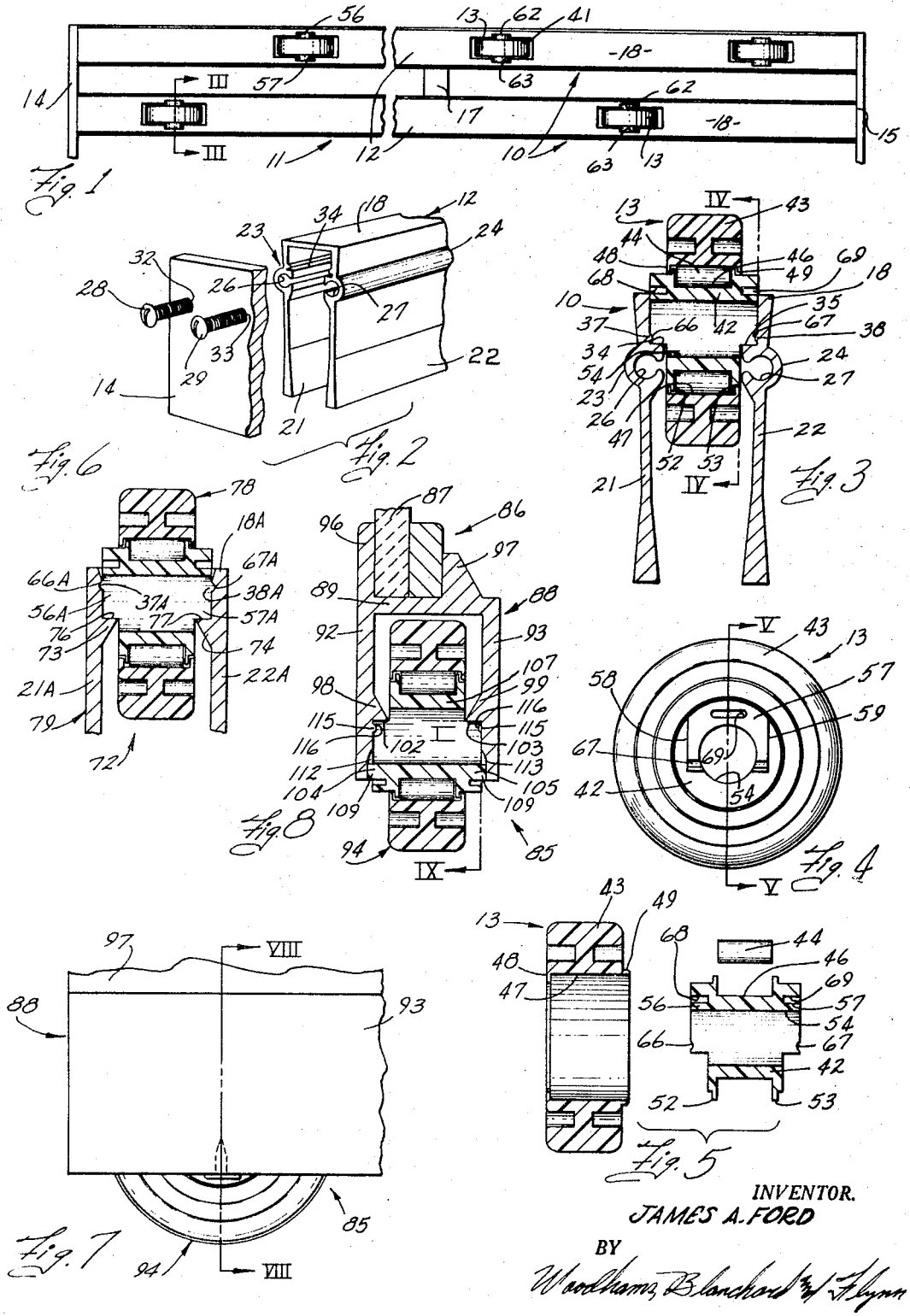

United States Patent Office 3,343,204
Patented Sept. 26, 1967

3,343,204
MODULAR CONVEYOR
James A. Ford, Sturgis, Mich., assignor to Kirsch Company, Sturgis, Mich., a corporation of Michigan
Filed Nov. 1, 1965, Ser. No. 505,802
16 Claims. (Cl. 16—97)

This invention relates in general to a modular conveyor and, more particularly, to a rail and roller structure which can be used as a means of supporting and moving objects including itself in a variety of adaptations.

Rail and roller structures are used in a variety of situations and for many purposes such as the support of horizontally sliding windows, doors and other closure members. These structures are also found in gravity type conveyors wherein articles and/or containers are moved by gravity down a sloping ramp formed from a plurality of the structures. However, existing rail and roller structures are relatively expensive to manufacture, where they are strong enough to serve their intended purposes, they are often heavy in weight, hence costly, and they are usually difficult to repair. Moreover, they are usually designed for a specific purpose so that one type of rail and roller structure is not easily converted to different uses. Devices, in which rail and roller structures are used, are often subjected to extremely rough use by persons who are not particularly concerned with the strength limitations of the devices or structures. Thus, low cost rail and roller structures have not been available.

Accordingly, the objects and purposes of this invention have been to provide:

(1) A rail and roller structure capable of inexpensive manufacture and assembly, capable of being adapted to a variety of uses without material change, capable of a long useful life, and capable of easy operation.

(2) A rail and roller structure, as aforesaid, which is light in weight, but strong in structure and trouble-free in operation.

(3) A rail and roller structure, as aforesaid, in which the roller means can be quickly and easily removed and replaced when necessary due to wear or damage.

Other objects and purposes of this invention will become apparent to persons familiar with this type of structure upon reading the following descriptive material and examining the accompanying drawings, in which:

FIGURE 1 is a broken, fragmentary plan view of a conveyor utilizing the rail and roller structure of the invention.

FIGURE 2 is an exploded, perspective view of a fragment of one end of said conveyor.

FIGURE 3 is a sectional view taken along the line III—III in FIGURE 1.

FIGURE 4 is a sectional view taken along the line IV—IV in FIGURE 3.

FIGURE 5 is an exploded, sectional view taken along the line V—V in FIGURE 4 before the roller is assembled.

FIGURE 6 is a sectional view similar to that shown in FIGURE 3 and disclosing a modified rail.

FIGURE 7 is a fragmentary, side elevational view of a modified rail and roller structure.

FIGURE 8 is a sectional view taken along the line VIII—VIII in FIGURE 7.

FIGURE 9 is a sectional view taken along the line IX—IX in FIGURE 8.

FIGURE 10 is a bottom view of the rail structure appearing in FIGURE 7 with the roller removed therefrom.

FIGURE 11 is a sectional view taken along the line XI—XI in FIGURE 10.

FIGURE 12 is a bottom view of the journal member shown in FIGURE 8.

FIGURE 13 is a fragmentary, side elevational view of a further rail and roller structure embodying the invention.

FIGURE 14 is a sectional view taken along the line XIV—XIV in FIGURE 13.

FIGURE 15 is a sectional view taken along the line XV—XV in FIGURE 14.

FIGURE 16 is a sectional view taken along the line XVI—XVI in FIGURE 14.

FIGURE 17 is an oblique, partially broken, partially exploded view showing an end fitting for a traverse rod adapted for use with pulleys embodying the invention.

FIGURE 18 is a section taken along the line XVIII—XVIII in FIGURE 17.

For convenience in description, the terms "upper," "lower" and words of similar import will have reference to the structures embodying the invention as appearing in FIGURES 3, 6, 7 and 13. The terms "inner," "outer" and derivatives thereof will have reference to the geometric center of the structure embodying the invention and parts thereof.

General construction

The objects and purposes of the invention, including those set forth above, have been met by providing a rail and roller structure wherein at least one roller member is removably mounted within a channel-shaped rail member so that a portion of the peripheral surface of the roller member projects laterally beyond the rail member for rolling engagement with another surface. In one form of the invention, the roller projects through an opening in the web of the channel-shaped member and in another form of the invention, the roller extends between and beyond the free edges of the flanges remote from the web. The first-mentioned form of the structure can, for example, be assembled in multiple lengths to provide a gravity conveyor. The second form of the invention can, for example, be used as the lower glide rail of a horizontally movable closure member.

Detailed description

The rail and roller structure 10 (FIGURE 1) illustrates a preferred embodiment of the invention arranged to provide a gravity conveyor 11. Each said structure 10 is comprised of an elongated, channel-shaped and preferably metal rail 12 in and upon which a plurality of rollers 13 are mounted. The rail structures 10 are spaced and parallel and their opposite ends are connected by crossbars 14 and 15, which may be metallic and substantially identical. Intermediate tie members 17 of any convenient type may be provided. The rail 12 is preferably fabricated by extrusion and the rollers 13 are preferably molded from a plastic material, such as nylon.

The rail 12 (FIGURE 2) has a web 18 and a pair of substantially parallel flanges 21 and 22 which preferably extend substantially perpendicularly from the web 18 in the same direction and to approximately the same extent. The exact cross-sectional size and shape of the rail 12 may be varied substantially depending upon the particular end use. The flanges 21 and 22 have in this instance enlargements 23 and 24 which extend lengthwise thereof, which are spaced from the lateral edges of the flanges and which define lengthwise grooves 26 and 27 having substantially circular cross sections. As shown in FIGURE 2, the crossbar 14 may be secured to the end of a rail 12 by means of self-threading screws 28 and 29 which are slideably received through openings 32 and 33 in the crossbar and are threadedly received into the adjacent ends of the grooves 26 and 27, respectively, which are slightly smaller in diameter than the outside diameters of the screws 28 and 29.

The enlargements 23 and 24 preferably project inwardly from their respective flanges 21 and 22 to provide stop shoulders 34 and 35 for reasons appearing hereinafter.

A pair of relatively small beads 37 and 38 are integrally formed on the inner, opposing surfaces in the flanges 21 and 22, respectively, between the web 18 and the shoulders 34 and 35. Said beads 37 and 38 are preferably parallel with and spaced from said web 18. The web 18 is provided with a plurality of elongated, preferably uniformly spaced roller openings 41 into which the rollers 13 can be slideably inserted. The openings 41 are preferably narrower than the corresponding distance between the adjacent portions of the flanges 21 and 22.

Each roller 13 (FIGURES 3 and 4) has a journal 42, an outer ring or wheel 43 and a plurality of cylindrical bearing elements 44 which are rotatably disposed between the outer peripheral bearing surface 46 of the journal 42 and the inner bearing surface 47 of the ring 43. The journal 42, ring 43 and bearing elements 44 are preferably all made, as by molding, from a self-lubricating type of plastic material, such as nylon. However, any person familiar with the use and characteristics of plastic materials will quickly recognize that many different types and combinations of plastic materials may be used in a roller structure of this type.

As shown in FIGURE 5, the ring 43 is initially molded with an inwardly projecting flange 48 and an axially extending flange 49 adjacent the opposite axial ends of the surface 47. The journal 42 is provided with a pair of radially projecting flanges 52 and 53 which are located at the opposite axial ends of the bearing surface 46. The diameters of the flanges 52 and 53 are less than the diameter of the bearing surface 47, but greater than the inside diameter of the flange 48. The journal 42 has a concentric opening 54 therethrough which eliminates unnecessary material and thereby reduces both the cost and the weight of the roller, without compromsing strength.

The journal 42 has substantially rectangular end portions 56 and 57 at the opposite axial ends thereof. The end portions 56 and 57 have substantially parallel and upright edges, such as the edges 58 and 59 (FIGURE 4) on the end portion 56. The end portions are slideably received through notches 62 and 63 (FIGURE 1) in the lengthwise edges of the roller openings 41. This arrangement helps to prevent rotation of the journal 42 with respect to the rail 12.

A pair of elongated grooves 66 and 67 are provided in the lower axial ends of the end portions 56 and 57, respectively, preferably so that they are perpendicular to the side edges of said end portions and so that they will snugly engage and embrace the beads 37 and 38, respectively (FIGURE 3), when the flat lower edges of the end portions 56 and 57 are bearing snugly against the shoulders 34 and 35, respectively.

A pair of recesses 68 and 69 are provided in the axial ends of the end portions 56 and 57 (FIGURE 3) so that they are accessible above the web 18 when the beads 37 and 38 are in the grooves 66 and 67.

The rollers 13 are assembled by placing a plurality of bearing elements 44 between the flanges 52 and 53 on a journal 42 and then inserting the journal 42 and elements 44 into the opening in the ring 43 defined by the bearing surface 47. The flange 49 is then moved from its FIGURE 5 position into its FIGURE 3 position, as by a spinning or other forming operation, so that flange 49 overlaps the flange 53 and thereby permanently locks the journal 42 and bearing elements 44 within the ring 43.

*Operation*

It will be evident from the foregoing description that the rail and roller structure 10 can be quickly and easily assembled merely by inserting a roller 13 into each opening 41 in the web 18 of a rail 12 and forcing the roller downwardly until the beads 37 and 38 are received into the grooves 66 and 67, at which time the end portions 56 and 57 will bear snugly against the shoulders 34 and 35. If a gravity conveyor 11 is desired, several rail and roller structures 10 are interconnected in parallel relationship by means of crossbars 14 and 15 and time members 17.

If a roller 13 must be replaced, a pair of pointed instruments, such as two screw drivers, are inserted into the recesses 68 and 69 and, by applying a lever action, the journal 42 is moved upwardly until the beads 37 and 38 are disengaged from within the grooves 68 and 69. Thereafter, the roller can be easily and manually lifted out of the opening 41. A new roller can then be inserted into the opening 41 and urged downwardly until the journal 42 is again seated against the stop shoulders 34 and 35, and the beads 37 and 38 are in the grooves 68 and 69.

*Modified structures*

The modified rail and roller structure 72 (FIGURE 6) differs from the structure 10 (FIGURE 3) in that the enlargements 23 and 24 of FIGURE 3 are replaced by a pair of inwardly projecting, lengthwise ridges 73 and 74 having upwardly facing stop surfaces 76 and 77. Also, the grooves 66A and 67A are located in the walls of the flanges 21A and 22A, adjacent the web 18A, and the beads 37A and 38A are attached to the end portions 56A and 57A. In all other respects, the rail and roller structure 72 may be, and preferably is, identical with the rail and roller structure 10.

FIGURES 7 and 8 illustrate a rail and roller structure 85 adapted for use as the lower glide rail of a closure member 86 having a panel member 87, such as glass. The rail and roller structure 85 includes a channel-shaped rail 88 having a web 89 and a pair of downwardly projecting, preferably similar flanges 92 and 93 between which a plurality of rollers 94 are supported so that their peripheral surfaces extend substantially below the lower edges of the flanges 92 and 93. The panel member 87 is held, in any substantially conventional manner, between upwardly projecting, spaced flanges 96 and 97 which are preferably integral with the web 89. As in the case of the rail 12, the rail 88 may be and preferably is fabricated from metal by extrusion.

The flanges 92 and 93 (FIGURE 8) preferably have inwardly projecting and opposing ridges 98 and 99 which define downwardly facing stop shoulders 102 and 103 which perform the same function as the stop surfaces 76 and 77 in the rail 79. That is, they engage flat, radial surfaces on the end portions 104 and 105 at the opposite ends of the journal 107 for limiting upward movement thereof into the channel member or rail 88.

Said roller 94 may be substantially identical with the rollers 13 or 78 except that a pair of wedge-shaped ridges 108 and 109 are provided on the axial ends of the journal 107 for snug, sliding reception into the grooves 112 and 113 (FIGURE 10) in the inner surfaces of the flanges 92 and 93, respectively. The ridges 108 and 109 and the grooves 112 and 113 cooperate to hold the roller 78 in a selected position within, and lengthwise of the rail 88. Also, the ridges 108 and 109 assist in preventing relative rotation between the journal 107 and the rail 88. The grooves 112 and 113 are preferably made by inserting an abrading tool into the opening between the flanges 92 and 93 after the extrusion thereof. The roller 94 (FIGURE 8) is releasably held within the rail 88 when the beads 115 on the flanges 92 and 93 are disposed in the corresponding recesses 116 in the end portions 104 and 105, as discussed above with respect to the structure 10 shown in FIGURE 3.

The modified rail and roller structure 121 of FIGURES 13 and 14 may be substantially similar to the rail structure of FIGURE 8, except for the end structure of the journal 122 on the roller 123 and the corresponding portions of the flanges 125 and 126 of the rail 127. That is, the journal 122 is provided with flats 128 and 129 which are engageable with the stop shoulders 132 and 133 on the inwardly projecting ridges 134 and 135 of the flanges 126 and 127, respectively. However, the opening 137 through the journal 122 is completely surrounded at both axial ends thereof, which differs from the corresponding structure in FIGURE 3 for the journal 42.

The opposite ends of the journal 122 (FIGURE 14) and the adjacent portions of the flanges 125 and 126 are not provided with beads and grooves as in the case of the rail and roller structures 10 (FIGURE 8). Instead, opposing circular portions 138 and 139 of the flanges 125 and 126, respectively, are offset toward each other so that they are snugly received into the opposite ends of the opening 137, which may be concentric with the journal 122, when the flats 128 and 129 thereon are against the stop shoulders 132 and 133. In all other respects, the rail and roller structure 121 may be identical with the rail and roller structure of FIGURE 8.

Referring to FIGURES 17 and 18, there is shown a further modification of the invention to adapt same for use with the end fitting, or pulley housing, of a traverse rod construction. In said figures, there is shown a traverse rod 141 of any convenient design, such as that shown in my application Ser. No. 300,541, having an end fitting 142. Said pulley housing will normally be molded or cast of plastic or metallic material as convenient according to the characteristic desired in the finished product and will be connectible to the traverse rod 141 in any convenient manner, not shown, but which may, for example, be that shown in said application Ser. No. 300,541.

Said pulley housing 142 has an internal cavity 143 which extends through the upper side of the pulley housing for the reception of the pulleys, as hereinafter set forth, and extends through the bottom thereof for the exiting therefrom of the draw cords 144 and 146. In the sides of said cavity 143 there are provided channels 147 and 148 which terminate at the lower ends in shoulders 149 and 151. These channels correspond to the notches 62 and 63 above mentioned in connection with the structure of FIGURES 1–5 and the shoulders 149 and 151 correspond to the shoulders 34 and 35 shown in FIGURES 1–5. Ridges 152 and 153 are provided a short distance above the shoulders 149 and 151 and correspond in shape and function to the ridges 66 and 67 above described in connection with FIGURES 1–5.

A pulley 156 is provided with a concave periphery for the reception of the draw cord 144 and has a hub 157 identical with the journal 42 of FIGURES 1–5, same having a rectangular bottom surface for snug engagement with the shoulders 149 and 151 and concave grooves for the reception of the ridges of 152 and 153.

Thus, said pulley may be snapped into place in the end housing 142 in the same manner as the rollers are snapped into place in the conveyor shown in FIGURES 1–5.

Similar channels 158 and 159 may be provided for the reception of a second pulley 161 for the guiding of the draw cord 146.

A cover 162 may be provided if desired to close the opening 143.

This arrangement will permit a very rapid assembly of pulley housings merely by snapping pulley assemblies into place in their respective channels and same can be equally easily removed for inspection and/or replacement if desired. The draw cords may be quickly applied through the opening 143 and the same then closed by applying the cover 162 to provide a neat and attractive appearance.

From the foregoing disclosures, it will be apparent that a variety of modifications can be made in the detailed structure for the purpose of adapting the invention to still other uses. However, it will be understood that such variations or modifications, which come within the scope of the appended claims, are fully contemplated.

The embodiments of the invention in which an exclusive property or privilege is claimed are defined as follows:

1. A wheel mounting structure, comprising:
a member having a pair of spaced flanges;
first interengaging means on the inner side of at least one of said flanges;
roller means including an outer ring, a journal and bearing means therebetween, said ring being axially narrower than the distance between said flanges near said first interengaging means and said journal being transaxially receivable between said flanges adjacent said first interengaging means, said journal having second interengaging means with which said first interengaging means cooperates when said journal is urged transaxially between said flanges, whereby said roller means is releasably held within said channel member and said ring is freely rotatable with respect to said journal and said member; and
cooperating stop means on said journal and said member, said stop means being engaged when said first and second interengaging means are interengaged for positively opposing further transaxial movement of said roller means with respect to said member.

2. A wheel mounting structure, comprising:
an elongated member having a pair of spaced flanges;
first interengaging means on the inner side of at least one of said flanges;
roller means including an outer ring, a journal and bearing means therebetween, said ring being axially narrower than the distance between said flanges near said first interengaging means and said journal being transaxially receivable between said flanges adjacent said first interengaging means, said journal having second interengaging means with which said first interengaging means cooperates when said journal is urged transaxially between said flanges transversely to its longitudinal axis, whereby said roller means is releasably held within said channel member and said ring is freely rotatable with respect to said journal and said member;
first cooperating stop means on said journal and said member, said stop means being engaged when said first and second interengaging means are interengaged for positively opposing further transaxial movement of said roller means with respect to said member; and
second cooperating stop means on said journal and said member for positively limiting movement of said journal with respect to said member in a direction parallel with its lengthwise extent.

3. A rail and roller structure, comprising:
a substantially channel-shaped member having a web and a pair of spaced flanges extending in substantially the same direction from said web;
first interengaging means on the inner side of at least one of said flanges;
roller means including an outer ring, a journal and antifriction bearing means therebetween, said ring being axially narrower than the distance between said flanges near said first interengaging means and said journal being transaxially receivable between said flanges adjacent said first interengaging means, said journal having second interengaging means with which said first interengaging means cooperates when said journal is urged transaxially between said flanges, whereby said roller means is releasably held within said channel member when a portion of the peripheral surface of said outer ring projects beyond said channel-shaped member and said ring is freely rotatable with respect to said journal and said channel-shaped member; and
cooperating stop means on said journal and said channel-shaped member, said stop means being engaged when said first and second interengaging means are interengaged for positively opposing further transaxial movement of said roller means into said channel-shaped member.

4. A rail and roller structure, comprising:
a substantially channel-shaped member having a web and a pair of spaced flanges extending in substantially the same direction from said web;

first interengaging means on the opposing sides of said flanges and spaced from the lateral edges thereof;

roller means including an outer ring, a journal and antifriction bearing means therebetween, said ring being axially narrower than the distance between said flanges near said first interengaging means and said journal being snugly and transaxially receivable between said flanges adjacent said first interengaging means, said journal having second interengaging means at both axial ends thereof with which said first interengaging means cooperate when said journal is urged transaxially between said flanges, whereby said roller means is releasably held within said channel member when a portion of the peripheral surface of said outer ring projects beyond said channel-shaped member and said ring is freely rotatable with respect to said journal and said channel-shaped member; and cooperating stop means on the axial ends of said journal and on the flanges of said channel-shaped member, said stop means being engaged when said first and second interengaging means are interengaged for positively opposing further transaxial movement of said roller means into said channel-shaped member.

5. A structure according to claim 4, wherein said rail structure is the lower rail of a closure member, wherein said channel-shaped member opens downwardly and said portion of the peripheral surface of the outer ring projects below said channel-shaped member; and wherein said channel-shaped member has panel engaging flange means connected to and extending upwardly from said web thereof.

6. A structure according to claim 5, wherein said channel-shaped member is metallic and said roller means is plastic; and wherein said journal means has a pair of recesses in the opposite axial ends thereof which are disposed below the lower edges of said flanges when said first and second interengaging means are interengaged.

7. A structure according to claim 4, wherein a plurality of said roller means are disposed at spaced intervals along said channel-shaped member;

wherein said channel-shaped member is metallic and said roller means is plastic; and wherein said journal has recess means in both axial ends thereof accessible when said first and second interengaging means are interengaged.

8. A structure according to claim 4, wherein said web has a plurality of spaced openings therein into which said journal means is transaxially receivable when the axis thereof is substantially perpendicular to said flanges, said first and second interengaging means being interengaged when a substantial portion of the peripheral surface of said outer ring projects beyond said web.

9. A structure according to claim 8, wherein said channel-shaped member is metallic and said roller means is plastic;

wherein a roller means is disposed within each of said openings in said web; and wherein each journal has recess means in its opposite axial ends, said recess means being accessible outwardly of said web.

10. A structure according to claim 9, including interconnecting means associated with the opposite ends of a plurality of said channel-shaped members for holding same in spaced and substantially parallel positions so that said portions of the peripheral surfaces substantially define a plane.

11. A rail structure for a gravity conveyor, comprising:
a substantially channel-shaped member having a web and a pair of spaced flanges extending substantially the same direction from said web, said web having at least one opening therethrough;

first interengaging means on the inner side on at least one of said flanges near to said opening and at a point thereon spaced from said web;

roller means including an outer ring, a journal and antifriction bearing means therebetween, said ring being axially narrower than said opening and the distance between said flanges adjacent said opening, and said journal being substantially equal to the distance between said flanges adjacent said opening, said journal having second interengaging means in one axial end thereof with which said first interengaging means cooperates when said journal is urged through said opening in said web and between said flanges, whereby said roller means is releasably held within said channel member so that said outer ring projects through and beyond said web, and said ring is freely rotatable; and support means on the axial ends of said journal for engagement by said channel-shaped member when said first and second interengaging means are interengaged to positively limit movement of said roller into said channel-shaped member.

12. The device defined in claim 11 including a notch in each side of said opening for receiving the ends of said journal whereby to provide limit means for positively preventing movement of said journal with respect to said rail lengthwise along said rail.

13. The device defined in claim 11 including limit means positively preventing movement of said journal lengthwise along said rail structure.

14. A rail structure for a gravity conveyor, comprising:
a substantially channel-shaped member having a web and a pair of spaced flanges extending in substantially the same direction from said web, said web having at least one opening therethrough;

first interengaging means on the inner side of at least one of said flanges near to said opening;

roller means including an outer ring, a journal and antifriction bearing means therebetween, said ring being axially narrower than said opening and the distance between said flanges adjacent said opening, said journal being receivable between said flanges adjacent said opening and having second interengaging means with which said first interengaging means cooperates when said journal is urged transaxially through said opening and disposed between said flanges, whereby said roller means is releasably held within said channel member when a portion of the peripheral surface of said outer ring projects through said opening and beyond said web and said ring is freely rotatable with respect to said journal and said channel-shaped member; and cooperating stop means on said journal and said channel-shaped member, said stop means being engaged when said first and second interengaging means are interengaged for positively opposing further transaxial movement of said roller means into said channel-shaped member.

15. A rail structure for a gravity conveyor, comprising:
a substantially channel-shaped member having a web and a pair of spaced flanges extending in substantially the same direction from said web, said web having at least one opening therethrough;

first interengaging means on the inner side of at least one of said flanges near to said opening and at a point thereon spaced from said web;

roller means including an outer ring, a journal and antifriction bearing means therebetween, said ring being axially narrower than said opening and the distance between said flanges adjacent said opening, and said journal being receivable between said flanges adjacent said opening, said journal having second interengaging means at one axial end thereof with which said first interengaging means cooperates when said journal is urged transaxially through said opening in said web and disposed between said flanges, whereby said roller means is releasably held within said channel member when a portion of the peripheral surface of said outer ring projects through said opening and beyond said web and said ring is freely rotatable with respect to said journal and said channel-shaped member; and cooperating stop means on the axial ends of said journal and on the flanges of said channel-shaped member, said stop means being engaged when said first and second interengaging means are interengaged for positively opposing further transaxial movement of said roller means into said channel-shaped member.

16. End pulley structure for a traverse rod, comprising:

a housing having a pair of spaced flanges and means for mounting same to the end of a traverse rod;

first interengaging means on the inner side of at least one of said flanges;

roller means including an outer ring having an externally grooved periphery, a journal and bearing means therebetween, said ring being axially narrower than the distance between said flanges near said first engaging means and said journal being transaxially and receivable between said flanges adjacent said first interengaging means, said journal having second interengaging means with which said first interengaging means is cooperable for releasably holding said journal in a preselected position between and with respect to said flanges;

first cooperating stop means on said journal and said flanges, said stop means being interengaged when first and second engaging means are interengaged for positively limiting further transaxial movement of said roller means with respect to said flanges in a direction transverse to the projected axis of said traverse rod; and second cooperating stop means on said journal and said flanges for positively limiting movement of said journal with respect to said flanges in a direction parallel to said projected axis.

References Cited
UNITED STATES PATENTS

| | | | |
|---|---|---|---|
| 1,083,954 | 1/1914 | Tatje | 16—97 |
| 2,149,349 | 3/1939 | Kilian | 308—6 |
| 3,194,610 | 7/1965 | Stewart | 308—3.8 |

MARVIN A. CHAMPION, *Primary Examiner.*

D. L. TROUTMAN, *Assistant Examiner.*